United States Patent Office 2,709,700
Patented May 31, 1955

2,709,700

PENICILLIN SALT OF BIS-(ALPHA-PHENETHYL)-ETHYLENE DIAMINE

Joseph Lester Szabo, Drexel Hill, and William F. Bruce, Havertown, Pa., assignors, by mesne assignments, to American Home Products Corporation, New York, N. Y., a corporation of Delaware No Drawing. Application July 2, 1952, Serial No. 296,938

1 Claim. (Cl. 260—239.1)

This invention relates to derivatives of ethylene diamine and its homologues and, more particularly, to new mono- and poly-substituted-amino-alkylene diamine salts.

Certain substituted alkylene diamines have been found with bronchodilator and antihistaminic action and also found useful as intermediates in the preparation of desired organic compounds. In addition, it has been discovered that many of these compounds are useful for separating penicillin from aqueous solutions by forming a salt therewith. Many of these salts are substantially insoluble or, at most, sparingly soluble in an aqueous medium. One is thus able to isolate and, if desired, to purify penicillin since it has been found that the latter can be almost quantitatively removed from its solution by the addition of one or two molecules of penicillin to these particular diamines.

As an additional discovery, these substantially insoluble or sparingly soluble salts of penicillin have been found to be valuable from a pharmacological aspect since they are relatively non-toxic and, when in contact with body fluids, slowly release penicillin for utilization in combatting bacterial infections. A prolonged antibiotic effect can thus be achieved without difficulty. By the use of these new penicillin salts, one greatly reduces the number of injections required to sustain the desired blood level concentration of penicillin.

The diamines contemplated as useful in the formation of penicillin salts are those having the general formula $$R \cdot NH \cdot alk \cdot NH \cdot R'$$

where R and R' represent carbocyclic aromatic radicals, particularly those aromatics of the aralkyl series, while alk is intended to represent an alkylene group having more than one carbon atom and preferably 2 to 12 carbon atoms either in a straight-chain or branch-chain form.

In geenral, the N,N'-di-substituted diamines of the invention may be prepared by starting with an aromatic ketone having the formula

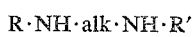

where X may represent either hydrogen or one to three substituent radicals such as lower alkyl, lower alkoxy or halogen groups while $R_1$ stands for a lower alkyl radical having from 1 to 7 carbon atoms. The ketone which may, if desired, be solubilized in a suitable solvent such as alcohol or benzene is reacted with an alkylene diamine to form a diimine or Schiff's base. The reaction product is then reduced catalytically under low pressure hydrogenation with a suitable hydrogenation catalyst to form the free base. The following reactions illustrate the procedure.

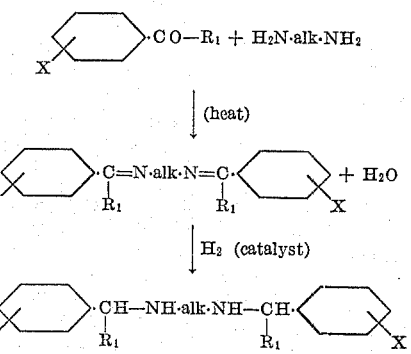

In preparing the penicillin salts, one may react a non-aqueous solution of the free base with a non-aqueous solution of penicillin using suitable solvents such as ether, acetone, ethyl acetate, amyl acetate, etc. However a more preferred procedure for preparing penicillin salts of the base is to react water-soluble salts of penicillin and the base in an aqueous medium. Since the penicillin salts formed by the union of penicillin with the substituted alkylene diamines are sparingly water-soluble or substantially water-insoluble, the desired salt precipitates from the aqueous medium and may then be easily isolated. The latter procedure is also useful in freeing penicillin from undesired elements since it will isolate the penicillin from a substantial proportion of its impurities by selectively combining with the antibiotic and forming a penicillin salt. This salt may then be cleaved to release the penicillin in a purer form.

In order to obtain water-soluble salts of the alkylene diamines, inorganic or organic acids may be used. As examples of useful inorganic acids may be mentioned hydrochloric, sulfuric, phosphoric, nitric or hydrobromic acids. Organic acids which have formed desirable salts are acetic, lactic, succinic, malic, aconitic, and tartaric acids. Preferably water-soluble salts, namely salts having a solubility of at least about 5% by weight per unit of liquid volume at 25° C. are particularly useful for aqueous solutions to be reacted with a penicillin salt. Any acid forming a salt having at least this solubility would be effective.

In preparing penicillin salts, the diamine salts are generally solubilized in an aqueous medium and reacted with an aqueous penicillin salt solution. Where the reactions are to take place in an aqueous solution, it has been found advantageous to use relatively soluble diamine salts in preparing the penicillin salts thereof since less liquid volume is handled and therefore losses are likely to be less than if relatively insoluble salts were used. While salts made with the inorganic acids can be used in preparing the penicillin compounds, it has been found that their solubility is quite low and well below 5% on a weight basis. Consequently, the diacetates, having a solubility in the neighborhood of about 10% or higher have been found particularly effective where it is desired to handle relatively low liquid volumes and therefore high concentrations.

The salts formed may be either mono-salts or di-salts depending on the amounts of base and acid used. Thus, if one mol equivalent each of penicillin salt and base salt were used, the mono-salt would be formed. On the other hand, if two mol equivalents, or an excess of penicillin salt, are used with one mol of the diamine, the di-salt would be formed. For making penicillin salts from the diamines, one would generally desire the double salt instead of the mono-salt since two mols of penicillin would be combined when using the former, whereas only one mol of penicillin combines in the monosalt.

Any of the known soluble penicillin salts may be combined with the substituted diamines. Thus, one may use the alkali or alkaline earth metal salts of penicillin G, dihydro F, X, or penicillin K for combination with the selected diamine. However the more preferred penicillin salts are the sodium or potassium salts of penicillin G. One or two molecules of any penicillin above indicated will unite with one molecule of the diamine, depending on the use of the mono- or the di-salt.

*Example*

Sixty grams (0.5 mole) of acetophenone and 19 cc. (0.25 mole) of 80% ethylene diamine were mixed and heated slowly to 100–115° C. The temperature was held for 2 to 3 hours and was then raised to 170° C. About 10–12 cc. of water distilled off. The reaction mixture was cooled and poured into 250 cc. of isopropanol. Yellow crystals of N,N'-di-(α-methylbenzal)ethylene diamine separated out. M. P. 101–103° C.

13.2 g. (0.05 mole) of the diimine was suspended in 75 cc. of glacial acetic acid and hydrogenated with 0.2 grams of platinum oxide catalyst. Six and one-half pounds of hydrogen at gauge pressure was taken up in 20 minutes (theory, 7 lbs.). The solution was filtered from the catalyst and concentrated under vacuum. This product may be used in preparing the penicillin salt.

To obtain the free base, the syrupy residue was taken up in 150 cc. of methyl alcohol and made alkaline with solid sodium hydroxide. The solution was concentrated on a steam bath until crystals of sodium acetate formed. The solution was cooled, filtered and the crystals were then washed with ether. The ether extract was added to the filtrate which was then washed with water. The filtrate was dried, concentrated and distilled to obtain N,N'-di-(α-methylbenzyl)ethylene diamine.

In preparing the penicillin salt from the alkylene diamine free base, 60 grams of the base was suspended in 300 cc. of water to which was added glacial acetic acid until neutrality was reached, 30–31 g. of acid being added. This formed the diacetate salt of the base. A second solution was prepared consisting of 160 g. of potassium penicillin in 400 cc. water. These two solutions were then added simultaneously (dropwise) to 500 cc. of water with vigorous stirring. Almost immediately a white solid began to precipitate. When the addition was complete, the mixture was refrigerated overnight. The solid was filtered off, washed twice with water and once with acetone. The moist, finely granular material was spread out on filter paper, allowed to dry in air overnight, ground (weight 235.5 g., theory 210 g.) M. P. 123–4° (Fisher block) and again spread out to dry. From the acetone washes an additional small crop of crystalline needles can be obtained by partial evaporation of the solvent. These crystals melt sharply at 125–126° (Fisher block).

*Analysis.*—$(C_6H_5CH(CH_3)NHCH_2)_2 \cdot 2(C_{16}H_{18}O_4N_2S)$

Calc: S, 6.83. Found: S, 6.6, 6.7. Solubility 950 units/ml. Optical Rotation $[\alpha]_D^{25}=+217$. Assay 1040 units/mg.

In place of acetophenone, other aromatic ketones, prepared by known methods, may be used, keeping the same molar proportions. As an example, in place of acetophenone one may use p-methoxyphenyl-methyl ketone, p-ethoxyphenyl-ethyl ketone, p-bromophenyl-methyl ketone, o, m, or p-chlorophenyl-methyl ketone, o,m- or o,p-dichlorophenyl-methyl ketone, o, m, or p-methylphenyl-ethyl ketone, m,m',p-trimethylphenyl-methyl ketone and other known substituted-phenyl-alkyl ketones having the formula

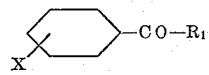

where X and $R_1$ have the meanings indicated above. Where one desires N,N'-disubstituted alkylene diamines having hydroxy substituents on the phenyl rings, compounds of this type may be obtained by hydrolyzing the corresponding lower alkoxy substituent groups in known manner, using 48% hydrobromic acid.

The above example illustrates a procedure for preparing typical salts. It should be noted that this example is to be taken as merely illustrative and not limitative of the invention.

We claim:

The new compound N,N'-di-(α-methylbenzyl)ethylene diamine dipenicillin.

References Cited in the file of this patent

UNITED STATES PATENTS 2,557,762   Rawlins et al. _____ June 19, 1951
2,578,641   Cooper _____ Dec. 11, 1951

OTHER REFERENCES

Szabo, Edwards and Bruce: "Antibiotics and Chemotherapy," vol. 1, November 1951, pp. 499 to 503.